(12) United States Patent
Larkins

(10) Patent No.: US 11,930,929 B2
(45) Date of Patent: Mar. 19, 2024

(54) VEGETATION HANGING AND DRYING SYSTEM

(71) Applicant: DriFlower, LLC, Ashland, OR (US)

(72) Inventor: Todd Chandler Larkins, Ashland, OR (US)

(73) Assignee: DRIFLOWER, LLC, Ashland, OR (US)

( * ) Notice: Subject to any disclaimer, the term of this patent is extended or adjusted under 35 U.S.C. 154(b) by 53 days.

(21) Appl. No.: 17/683,940

(22) Filed: Mar. 1, 2022

(65) Prior Publication Data
US 2022/0279928 A1 Sep. 8, 2022

Related U.S. Application Data

(60) Provisional application No. 63/155,849, filed on Mar. 3, 2021, provisional application No. 63/155,851, filed on Mar. 3, 2021.

(51) Int. Cl.
| | | |
|---|---|---|
| A47B 96/06 | (2006.01) | |
| A47B 81/00 | (2006.01) | |
| A47B 96/14 | (2006.01) | |

(52) U.S. Cl.
CPC .............. *A47B 96/06* (2013.01); *A47B 81/00* (2013.01); *A47B 96/14* (2013.01)

(58) Field of Classification Search
CPC ......... A47B 96/06; A47B 81/00; A47B 96/14; A01F 25/12; E04G 1/32
USPC ...... 182/153, 181.1, 185.1, 183.1, 224, 227; 211/204, 206; 248/163.1, 431, 440.1
See application file for complete search history.

(56) References Cited

U.S. PATENT DOCUMENTS

| | | | | |
|---|---|---|---|---|
| 376,876 A | * | 1/1888 | Goodrich | B25H 1/06 |
| | | | | 108/147.22 |
| 453,200 A | * | 6/1891 | Melcher | E04G 1/32 |
| | | | | 182/182.3 |
| 695,310 A | * | 3/1902 | Hersh | E04G 1/32 |
| | | | | 256/64 |
| 887,560 A | * | 5/1908 | White | E04G 1/32 |
| | | | | 182/182.3 |

(Continued)

FOREIGN PATENT DOCUMENTS

| | | |
|---|---|---|
| CA | 2458956 A1 | 9/2004 |
| CN | 105474854 A | 4/2016 |

(Continued)

OTHER PUBLICATIONS

Chrystal Johnson: 11 How to dry herbs from your Garden, Happy Mothering natural living in a modern world Aug. 29, 2017 (Aug. 29, 2017), Retrieved from the Internet: URL:https://www.happy-mothering.com/diy-hanging-herb-dryer/.

(Continued)

*Primary Examiner* — Kimberly T Wood
(74) *Attorney, Agent, or Firm* — Carter, DeLuca & Farrell, LLP; George Likourezos

(57) ABSTRACT

A multi-rack bracket of a vegetation and drying system includes a triangular-shaped main plate, a pair of side plates extending perpendicularly from opposing edges of the main plate, and first and second flanges extending vertically from the respective side plates and configured to capture a vertical support shaft therebetween. The multi-rack bracket is configured to secure the vertical support shaft and a pair of shafts of a leg assembly to one another.

17 Claims, 6 Drawing Sheets

(56) References Cited

U.S. PATENT DOCUMENTS

| | | | |
|---|---|---|---|
| 941,448 A | 11/1909 | Haglund | |
| 945,729 A | 1/1910 | Rangnow | |
| 1,321,997 A | 11/1919 | Duberstein | |
| 1,515,078 A | 11/1924 | Sheee | |
| 1,833,388 A | 11/1931 | Carmack | |
| 1,868,638 A | 7/1932 | Mackey | |
| 2,099,596 A | 11/1937 | Bruening | |
| 2,150,869 A | 3/1939 | Shafarman | |
| 2,279,777 A | 4/1942 | Dean | |
| 2,289,729 A | 7/1942 | Robinson et al. | |
| 2,376,787 A * | 5/1945 | Larson | B25H 1/16 403/171 |
| 2,411,856 A | 12/1946 | Harding | |
| 2,484,449 A | 10/1949 | Fetterman | |
| 2,546,929 A | 3/1951 | Nampa | |
| 2,580,193 A | 12/1951 | Richterkessing | |
| 2,586,913 A | 2/1952 | Burns | |
| 2,634,031 A | 4/1953 | Klein | |
| 2,638,386 A * | 5/1953 | Larson | B25H 1/06 182/186.3 |
| 2,671,938 A | 3/1954 | Roberts | |
| 2,692,711 A | 10/1954 | Norris et al. | |
| 2,716,513 A | 8/1955 | Braunstein | |
| 2,828,897 A | 4/1958 | Gordon | |
| 3,042,144 A * | 7/1962 | Larson | A47B 13/021 182/186.3 |
| 3,131,817 A | 5/1964 | Schenkler | |
| 3,194,458 A | 7/1965 | Bennett | |
| D202,954 S | 11/1965 | Hanson | |
| 3,329,239 A * | 7/1967 | Chesney | B25H 1/06 182/226 |
| 3,346,150 A | 10/1967 | Clopton | |
| D210,333 S | 2/1968 | Apy | |
| 3,535,808 A | 10/1970 | Morrish | |
| 3,606,948 A | 9/1971 | Strang | |
| 3,627,075 A * | 12/1971 | Enders | B25H 1/06 248/248 |
| 3,656,581 A * | 4/1972 | Larson | B25H 1/06 182/224 |
| 3,858,682 A * | 1/1975 | Larson | B25H 1/06 182/186.3 |
| 3,874,572 A | 4/1975 | McClenning | |
| D236,572 S | 9/1975 | Ostroll | |
| 4,192,406 A * | 3/1980 | Mitchell | B25H 1/06 182/186.3 |
| D264,912 S | 6/1982 | Bliss et al. | |
| 4,440,369 A | 4/1984 | Banks | |
| 4,703,878 A | 11/1987 | Louw | |
| 4,717,053 A | 1/1988 | Wang | |
| 4,724,967 A | 2/1988 | Valiulis | |
| 4,793,531 A | 12/1988 | Blanchard et al. | |
| 4,845,602 A | 7/1989 | Lehocki | |
| 4,881,342 A | 11/1989 | Ferguson | |
| 4,890,952 A * | 1/1990 | Jones | B25H 1/06 403/217 |
| 4,911,390 A * | 3/1990 | Flick | A47B 3/12 182/186.3 |
| 5,007,562 A | 4/1991 | Brink et al. | |
| 5,074,445 A | 12/1991 | Chen | |
| 5,102,078 A * | 4/1992 | Nordeng | E04G 1/34 248/440 |
| D331,425 S | 12/1992 | Rhyne | |
| D332,180 S | 1/1993 | Marshall et al. | |
| 5,329,728 A | 7/1994 | Ray | |
| 5,333,409 A | 8/1994 | Mendes | |
| 5,361,949 A | 11/1994 | Petrou | |
| 5,388,354 A | 2/1995 | Marshall et al. | |
| D357,813 S | 5/1995 | Koresko | |
| 5,520,311 A | 5/1996 | Lam | |
| 5,535,927 A | 7/1996 | Garrison | |
| 5,544,765 A | 8/1996 | Farbman | |
| 5,581,936 A | 12/1996 | Belgiorno | |
| 5,758,744 A * | 6/1998 | Forino | B25H 1/06 182/186.3 |
| 5,813,092 A | 9/1998 | Greenfield et al. | |
| 5,826,759 A | 10/1998 | Ohsugi | |
| 5,884,422 A | 3/1999 | Marshall et al. | |
| 6,047,867 A | 4/2000 | Heiber | |
| 6,132,305 A | 10/2000 | Witherell | |
| 6,298,600 B1 | 10/2001 | Feldman | |
| 6,340,238 B1 | 1/2002 | Pan | |
| 6,349,863 B1 | 2/2002 | Frye | |
| 6,389,744 B1 | 5/2002 | Pugh | |
| 6,641,105 B1 | 11/2003 | Hamerski | |
| 6,659,295 B1 | 12/2003 | De Land et al. | |
| 6,811,064 B2 | 11/2004 | Salem | |
| 6,817,497 B2 | 11/2004 | Grasso et al. | |
| D502,756 S | 3/2005 | Birdwell et al. | |
| 6,863,197 B1 | 3/2005 | Dirlam et al. | |
| 7,015,815 B1 | 3/2006 | Feibelman | |
| 7,178,705 B1 | 2/2007 | Sutton | |
| 7,377,409 B1 | 5/2008 | Brown | |
| 7,774,977 B2 | 8/2010 | Miller Shelton | |
| 7,984,585 B1 | 7/2011 | Wu | |
| 8,276,714 B2 | 10/2012 | Broyles | |
| 8,708,103 B2 * | 4/2014 | Bulley | B25H 1/06 182/186.3 |
| D711,123 S | 8/2014 | Birge | |
| 9,113,736 B1 | 8/2015 | Antler | |
| D772,584 S | 11/2016 | Debus | |
| 9,782,031 B2 | 10/2017 | Debus | |
| D806,410 S | 1/2018 | Denby et al. | |
| D853,737 S | 7/2019 | Wolfe | |
| D867,770 S | 11/2019 | Wright | |
| 2002/0038741 A1 * | 4/2002 | Krajec | B25H 1/06 182/186.3 |
| 2002/0184799 A1 | 12/2002 | Chou | |
| 2004/0226971 A1 | 11/2004 | Detten | |
| 2005/0035159 A1 | 2/2005 | Hunt et al. | |
| 2005/0139625 A1 | 6/2005 | Gouldson | |
| 2005/0189383 A1 | 9/2005 | Weal et al. | |
| 2006/0032130 A1 | 2/2006 | Liffers et al. | |
| 2006/0226179 A1 | 10/2006 | Hsu | |
| 2007/0068733 A1 * | 3/2007 | Schlecht | E04G 1/38 182/151 |
| 2007/0266627 A1 | 11/2007 | Shelton | |
| 2008/0236041 A1 | 10/2008 | Carpenter | |
| 2008/0283558 A1 | 11/2008 | Rude et al. | |
| 2009/0184073 A1 * | 7/2009 | Lu | A47G 25/0664 211/198 |
| 2009/0260921 A1 * | 10/2009 | Osborne | B25H 1/06 182/155 |
| 2011/0247185 A1 | 10/2011 | Bolden et al. | |
| 2011/0284597 A1 | 11/2011 | Kaleta et al. | |
| 2012/0132679 A1 | 5/2012 | Gouldson | |
| 2013/0015215 A1 | 1/2013 | Coote | |
| 2013/0221041 A1 | 8/2013 | Wittenstein et al. | |
| 2014/0246464 A1 | 9/2014 | Zhong | |
| 2014/0367425 A1 | 12/2014 | Laibe | |
| 2016/0058210 A1 | 3/2016 | Strassburger et al. | |
| 2016/0223137 A1 | 8/2016 | Ochipa | |
| 2017/0105362 A1 | 4/2017 | Irving, Jr. | |
| 2017/0238731 A1 | 8/2017 | Davies | |
| 2017/0325614 A1 | 11/2017 | Baltz | |
| 2018/0087293 A1 | 3/2018 | Strassburger et al. | |
| 2018/0103785 A1 | 4/2018 | Goldman et al. | |
| 2018/0160833 A1 | 6/2018 | Ho | |
| 2018/0303263 A1 | 10/2018 | Jones et al. | |
| 2018/0317685 A1 | 11/2018 | Boles | |
| 2018/0325299 A1 | 11/2018 | Clark et al. | |
| 2018/0356028 A1 | 12/2018 | Fang | |
| 2019/0014936 A1 | 1/2019 | Beyda et al. | |
| 2019/0307264 A1 | 10/2019 | Carr et al. | |
| 2019/0380522 A1 | 12/2019 | Johansson | |
| 2020/0085221 A1 | 3/2020 | Riedel et al. | |
| 2020/0128988 A1 | 4/2020 | Moore et al. | |
| 2020/0245796 A1 | 8/2020 | Gilbert | |

FOREIGN PATENT DOCUMENTS

| | | |
|---|---|---|
| CN | 206611910 U | 11/2017 |
| CN | 107896731 A | 4/2018 |

(56) References Cited

FOREIGN PATENT DOCUMENTS

| | | | |
|---|---|---|---|
| DE | 3246174 C2 | | 1/1994 |
| FR | 782967 A | * | 5/1935 |
| FR | 2464638 A1 | | 3/1981 |
| FR | 3062120 A1 | | 7/2018 |
| GB | 2213714 A | * | 8/1989 ............... B25H 1/06 |
| JP | 2008092939 A | | 4/2008 |
| JP | 4218802 B2 | | 2/2009 |
| JP | 4399093 B2 | | 1/2010 |
| JP | 2011010890 A | | 1/2011 |
| KR | 20-2005-0002675 A | | 1/2005 |
| KR | 2003821320000 Y1 | | 4/2005 |
| KR | 2011 0029352 A | | 3/2011 |
| KR | 101071670 B1 | | 10/2011 |
| KR | 2012 0131010 A | | 12/2012 |
| KR | 2017 0067056 A | | 6/2017 |
| KR | 20170079314 A | | 7/2017 |
| KR | 101938225 B1 | | 1/2019 |
| WO | 2018150157 A1 | | 8/2018 |

OTHER PUBLICATIONS

International Search Report and Written Opinion for Application No. PCT/US2020/042261 dated Nov. 2, 2020.
International Search Report and Written Opinion issued in corresponding International Application No. PCT/US2020/053426 dated Jan. 18, 2021, 14 pages.
International Search Report and Written Opinion issued in corresponding International Application No. PCT/US2020/054898 dated Jan. 22, 2021, 14 pages.
International Preliminary Report on Patentability issued in corresponding international application No. PCT/US2020/053426, 6 pages.

* cited by examiner

VEGETATION HANGING AND DRYING SYSTEM

CROSS-REFERENCE TO RELATED APPLICATIONS

This application claims the benefit of and priority to U.S. Provisional Patent Application Nos. 63/155,851 and 63/155,849 each filed on Mar. 3, 2021, the entire contents of each of which being incorporated by reference herein.

BACKGROUND

Recently there has been a widespread growth of the use of cannabis and hemp ranging from medicinal to recreational. In this widespread growth, the drying of cannabis and hemp has become an essential part of the processing of cannabis and hemp, but the process takes a significant amount of time and effort. Typically, the drying process requires the hemp and/or cannabis to be hung with plastic netting, which is not only time-consuming but requires a lot of manual labor and leaves little room for error.

The plastic netting process requires the hemp and/or cannabis to be hung one branch at time and threaded through the netting to secure the hemp and/or cannabis. Removal of the hemp and/or cannabis requires careful unthreading of the hemp and/or cannabis from the plastic netting. Additionally, from harvest to drying there is multiple contacts with the hemp and/or cannabis that diminishes the quality of the finished dried product. Therefore, there is a need to provide a system of hanging and drying vegetation, such as, hemp, cannabis, and other plants harvested and subsequently dried, without damaging the vegetation.

SUMMARY

In one aspect, the present disclosure provides a multi-rack bracket for use in a vegetation hanging and drying system. The multi-rack bracket includes a main plate, first and second side plates, and first and second flanges. The main plate has a generally triangular shape and includes a first lateral edge and an opposite second lateral edge. The first side plate extends perpendicularly from the first lateral edge of the main plate, and the second side plate extends perpendicularly from the second lateral edge of the main plate. The first flange extends upwardly from the first side plate, and the second flange extends upwardly from the second side plate. The first and second flanges define a gap therebetween configured for capturing a vertical support shaft of the vegetation hanging and drying system. The main plate, the first side plate, and the second side plate collectively define a cavity configured for receipt of a leg assembly and the vertical support shaft of the vegetation hanging and drying system.

In aspects, the main plate may include a bottom portion having the first and second lateral edges, and a top portion extending upwardly from the bottom portion. The top portion may extend alongside of the first and second flanges.

In aspects, the top portion of the main plate and the first and second flanges may collectively define a rectangular-shaped channel configured to capture the vertical support shaft therein.

In aspects, each of the first and second flanges may have a tab extending downwardly therefrom and into the cavity to resist tilting of the vertical support shaft relative to the first and second flanges.

In aspects, the tabs may be coplanar with the respective first and second flanges.

In aspects, each of the main plate, the first and second side plates, and the first and second flanges may have one or more holes configured for receipt of a fastener.

In aspects, the first side plate may be parallel with the first lateral edge of the main plate, and the second side plate may be parallel with the second lateral edge of the main plate.

In aspects, the first and second flanges may be parallel with one another.

In aspects, the main plate, the first and second side plates, and the first and second flanges may be monolithically formed with one another from a single piece of sheet metal.

In aspects, the first and second flanges may extend at an obtuse angle from the respective first and second side plates.

In accordance with another aspect of the present disclosure, a vegetation hanging and drying system is provided that includes a harvest stand, a first multi-rack bracket, and a second multi-rack bracket. The harvest stand includes first and second leg assemblies, a horizontal shaft configured to extend between and interconnect the first and second leg assemblies, and first and second vertical support shafts configured to extend upwardly from the respective first and second leg assemblies. The first multi-rack bracket is configured to secure the first leg assembly to the first vertical support shaft, and the second multi-rack bracket is configured to secure the second leg assembly to the second vertical support shaft. The first multi-rack bracket includes a main plate including a first lateral edge and an opposite second lateral edge, a first side plate extending perpendicularly from the first lateral edge of the main plate, a second side plate extending perpendicularly from the second lateral edge of the main plate, a first flange extending upwardly from the first side plate, and a second flange extending upwardly from the second side plate. The first and second flanges define a gap therebetween configured for capturing the first vertical support shaft. The main plate, the first side plate, and the second side plate collectively define a generally triangular-shaped cavity configured for receipt of the first leg assembly and the first vertical support shaft.

In aspects, the main plate may have a generally triangular shape.

In aspects, the vegetation hanging and drying system may further include a pair of hanging bar brackets configured to attach to top ends of the respective first and second vertical support shafts. Each of the pair of hanging bar brackets may include a main plate, and a pair of spaced-apart fingers extending upwardly from the main plate. The main plate of the hanging bar brackets defines one or more holes configured for receipt of a fastener. The main plate of the hanging bar brackets may be configured to abut the top end of the respective first and second vertical support shafts.

In aspects, the vegetation hanging and drying system may further include a horizontal support bar for supporting a plurality of hangers thereon. The pair of fingers of each of the hanging bar brackets may define a rectangular-shaped notch configured for receipt of an end portion of the horizontal support bar.

In aspects, the first leg assembly may include a pair of elongate elements configured to abut against the respective first and second side plates and the main plate of the first multi-rack bracket. The first vertical support shaft may be configured to be positioned and captured between the pair of elongate elements.

In accordance with aspects of the present disclosure, a hanging bar bracket for coupling to a vegetation and drying system is provided and includes a main plate defining one or more holes configured for receipt of a fastener, and a pair of spaced-apart fingers extending upwardly from the main plate. The pair of fingers define a rectangular-shaped notch configured for receipt of a horizontal support bar.

The details of the disclosure are set forth in the accompanying drawings and the description below. Other features, objects, and advantages of the techniques described in this disclosure will be apparent from the description and drawings, and from the claims.

As used herein, the terms parallel and perpendicular are understood to include relative configurations that are substantially parallel and substantially perpendicular up to about + or −10 degrees from true parallel and true perpendicular.

BRIEF DESCRIPTION OF DRAWINGS

Aspects of the presently disclosed multi-rack bracket are described in detail with reference to the drawings, in which like reference numerals designate identical or corresponding elements in each of the several views.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "top" and "bottom" are relative and used only in the context to the other, and are not necessarily "superior" and "inferior."

Figure 1:
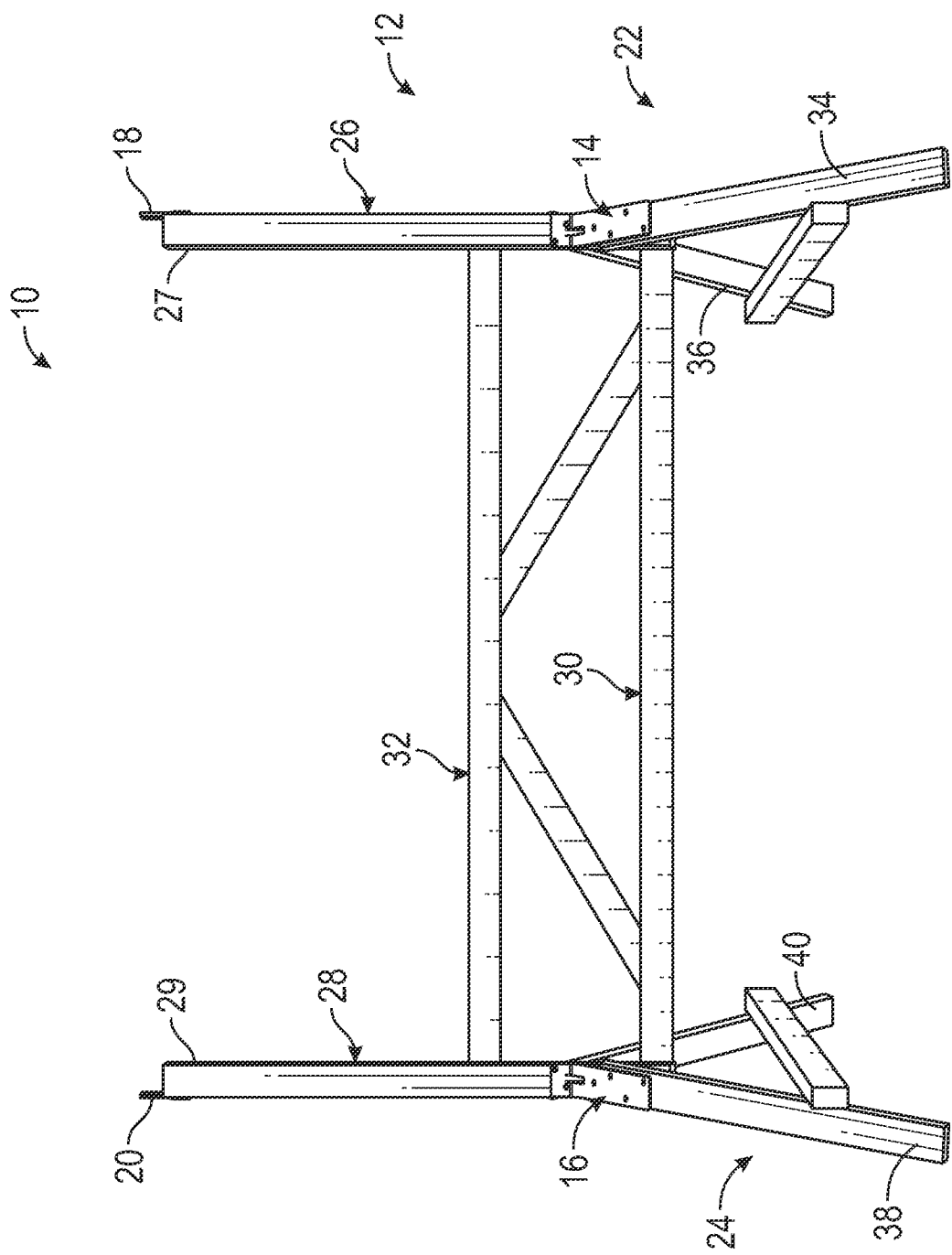
FIG. 1 is a front, perspective view illustrating a vegetation hanging and drying system including a stand assembled with a pair of multi-rack brackets, and a pair of hanging bar brackets attached to the stand.

With reference to FIG. 1, the present disclosure is directed to a vegetation hanging and drying system 10 for suspending vegetation, and most suitably cannabis, to allow the vegetation to dry after harvesting. The vegetation hanging and drying system 10 generally includes a stand 12, a pair of multi-rack brackets 14, 16 for assembling the components of the stand 12 together, and a pair of hanging bar brackets 18, 20 secured to opposite lateral sides of the stand 12 and configured to support a horizontal support bar 120 (FIG. 5), which allows for the hanging of vegetation hangers 140 (FIG. 5) thereon. The vegetation hangers 140 support the vegetation (e.g., cannabis) thereon to allow the vegetation to dry prior to harvesting.

The stand 12 of the vegetation hanging and drying system 10 includes first and second leg assemblies 22, 24, first and second vertical support shafts 26, 28 extending upwardly from respective first and second leg assemblies 22, 24, and first and second horizontal support shafts 30, 32 that couple, in a spaced-apart state, the first and second leg assemblies 22, 24 to one another. It is contemplated that the stand 12 may be provided as a kit where the end user assembles the various components to one another to build the stand 12. In other aspects, the stand 12 may be provided to the consumer preassembled.

Each of the first and second leg assemblies 22, 24 of the stand 12 includes first and second elongate elements 34, 36 and 38, 40 (e.g., dimensional lumber) configured to be angled relative to one another (e.g., from about 45 to about 90 degrees). The first vertical support shaft 26 is configured to be captured between top ends of the first and second elongate elements 34, 36 of the first leg assembly 22, and the second vertical support shaft 28 is configured to be captured between top ends of the first and second elongate elements 38, 40 of the second leg assembly 24. The first and second elongate elements 34, 36 of the first leg assembly 22 are configured to be fixed relative to one another and to the first vertical support shaft 26 using the first multi-rack bracket 14, and the first and second elongate elements 38, 40 of the second leg assembly 24 are configured to be fixed relative to one another and to the second vertical support shaft 28 using the second multi-rack bracket 16, as will be described in further detail below. Since the multi-rack brackets 14, 16 are identical or substantially similar, only the first multi-rack bracket 14 will be described in detail.

Figure 2:
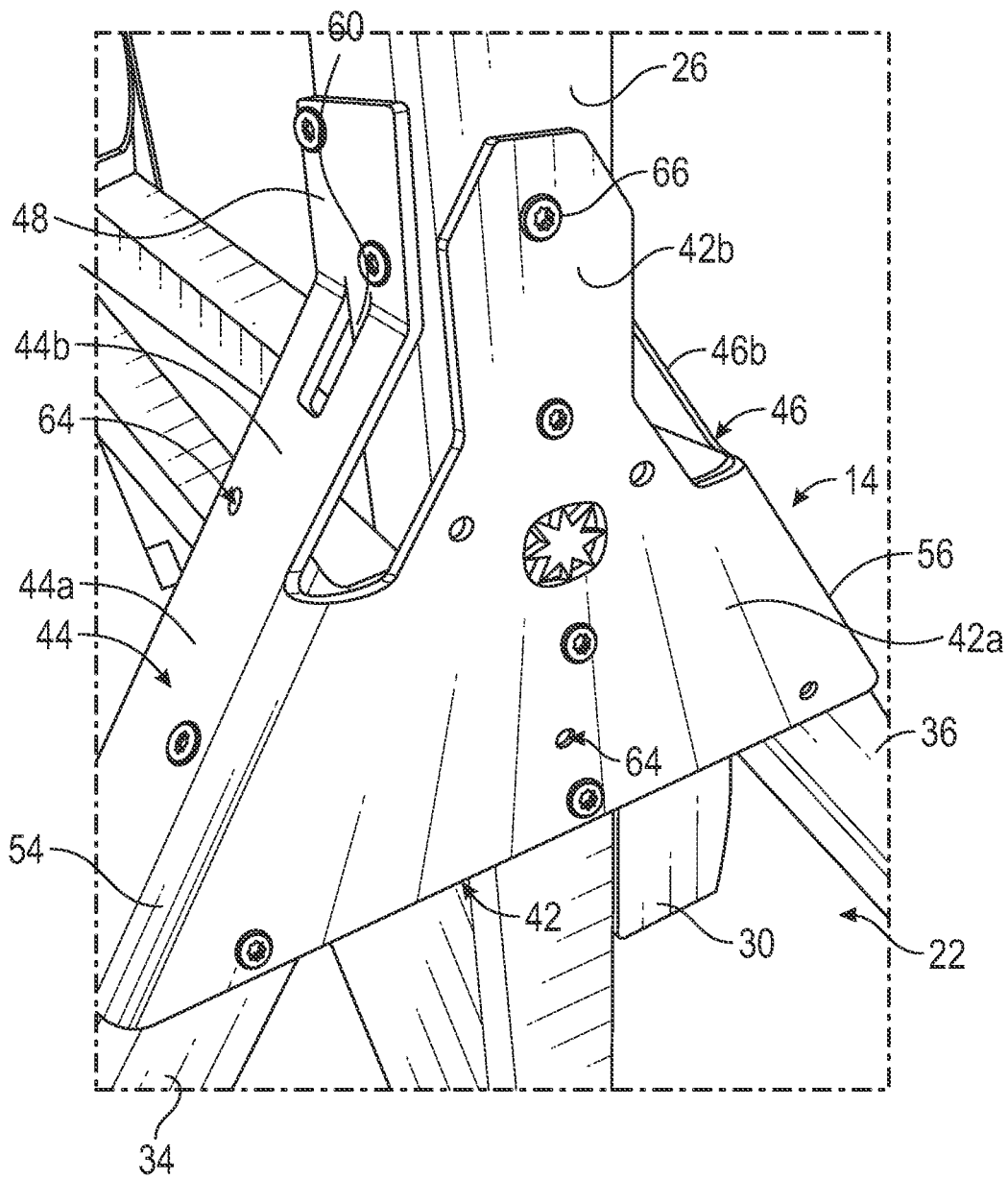
FIG. 2 is a side, perspective view illustrating a leg assembly of the stand and the multi-rack bracket securing the leg assembly to a vertical support shaft of the stand.
Figure 3:
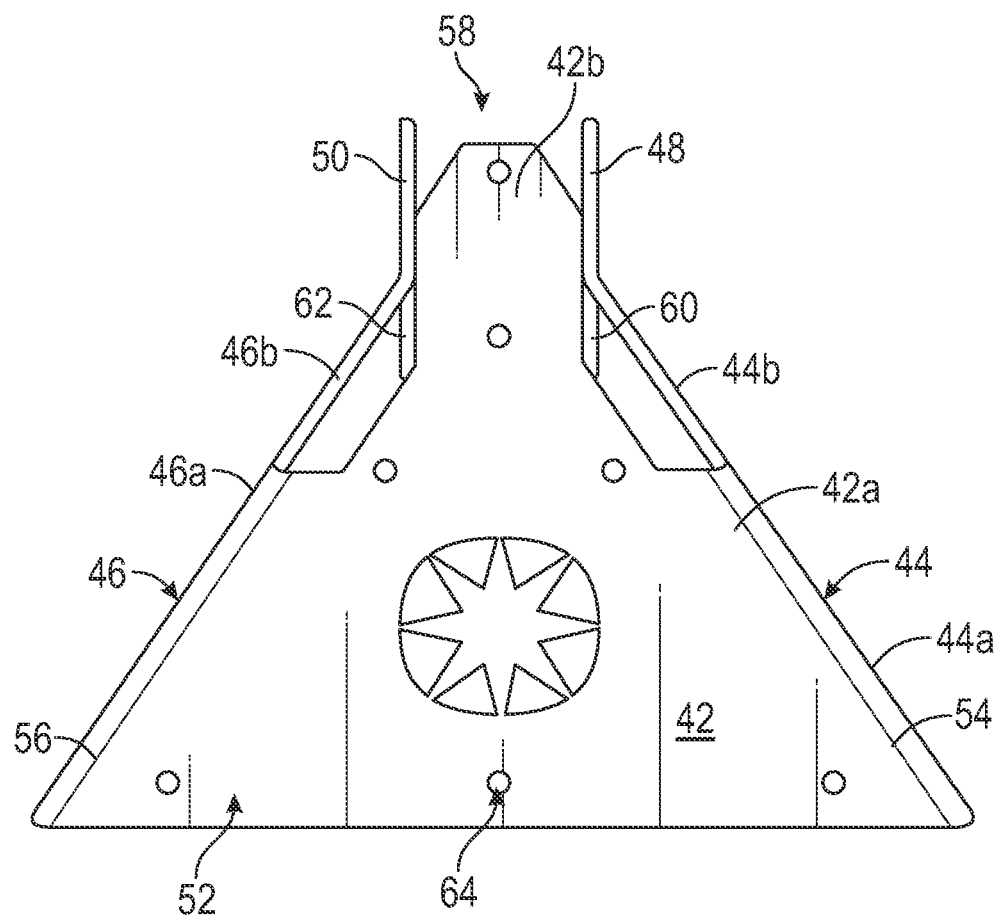
FIG. 3 is a plan view illustrating the multi-rack bracket of FIG. 2.

With reference to FIGS. 2 and 3, the multi-rack bracket 14 includes a main plate 42, first and second side plates 44, 46, and first and second flanges 48, 50. The main plate 42, the first and second side plates 44, 46, and the first and second flanges 48, 50 may be monolithically formed with one another from a single piece of sheet metal and bent relative to one another to form the bracket 14 as shown. The main plate 42, the first side plate 44, and the second side plate 46 collectively define a cavity 52, such as a triangular-shaped cavity, configured for receipt of the first leg assembly 22 and the vertical support shaft 26 of the stand 12.

The main plate 42 includes a bottom portion 42a having a trapezoidal shape, and a top portion 42b extending upwardly from the bottom portion 42a. The main plate 42 may have a generally triangular shape. The bottom portion 42a has a first lateral edge 54 and an opposite second lateral edge 56. The first side plate 44 may have a rectangular shape and extend perpendicularly from the first lateral edge 54 of the bottom portion 42a of the main plate 42, and the second side plate 46 may have a rectangular shape and extend perpendicularly from the second lateral edge 56 of the bottom portion 42b of the main plate 42.

More specifically, the first side plate 44 has a bottom portion 44a that is bent relative to or about the first lateral edge 54 of the main plate 42 at a perpendicular angle, and the second side plate 46 has a bottom portion 46a that is bent relative to or about the second lateral edge 56 of the main plate 42 at a perpendicular angle. As such, the bottom portion 44a of the first side plate 44 extends parallel with and along the first lateral edge 54 of the main plate 42, and the bottom portion 46a of the second side plate 46 extends parallel with and along the second lateral edge 56 of the main plate 42. In aspects, the first and second side plates 44, 46 may be coupled to the respective first and second lateral edges 54, 56 of the main plate 42 via any suitable fastening means, such as, for example, welding, adhesive, soldering, or the like.

The first side plate 44 further includes a top portion 44b that is spaced from the top portion 42b of main plate 42, and the second side plate 46 has a top portion 46b that is spaced from the top portion 42b of the main plate 42 to allow for flexing of the upper portion of the multi-rack bracket 14 to facilitate accommodating the components of the first leg assembly 22 therein.

The first flange 48 of the multi-rack bracket 14 extends upwardly at an obtuse angle (e.g., from about 100 degrees to about 165 degrees) from the top portion 44b of the first side plate 44. The second flange 50 of the multi-rack bracket 14 extends upwardly at an obtuse angle from the top portion 46b of the second side plate 46. The first and second flanges 48, 50 face one another, extend parallel with one another, and are spaced-apart to define a gap therebetween configured for capturing the first vertical shaft 26 of the vegetation hanging and drying system 10. The first and second flanges 48, 50 define a plane extending perpendicularly to a plane defined by the top portion 42b of the main plate 42 such that the first and second flanges 48, 50 and the top portion 42b of the main plate 42 collectively define a rectangular-shaped channel 58 configured to capture the first vertical support shaft 26.

Each of the first and second flanges 48, 50 has a tab 60, 62 extending downwardly therefrom and into the cavity 52 to resist tilting of the vertical support shaft 22 relative to the first and second flanges 48, 50. The tabs 60, 62 are coplanar with the respective first and second flanges 48, 50. The tabs 60, 62 may be formed by making rectangular cutouts in the top portions 44b, 46b of the first and second side plates 44, 46 and bending the first and second flanges 48, 50 relative to the top portions 44b, 46b of the first and second side plates 44, 46.

Each of the main plate 42, the first and second side plates 44, 46, and the first and second flanges 48, 50 has a plurality of holes 64 defined therethrough configured for receipt of a metal fastener, such as, for example, a screw. In aspects, the multi-rack bracket 14 may be fabricated from a lightweight metal, plastic, composite material, or any other suitable material.

Figure 4:
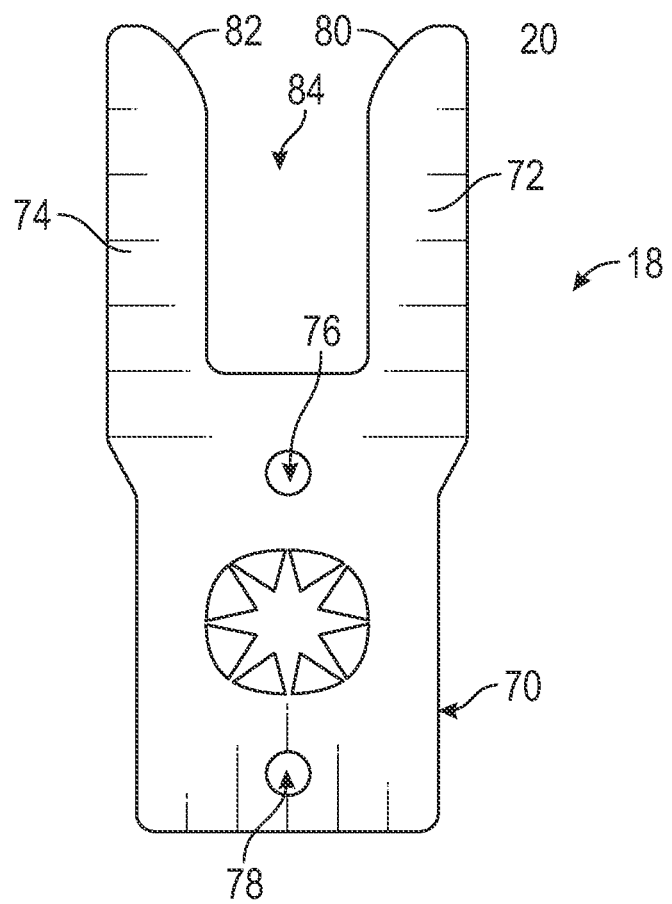
FIG. 4 is a plan view illustrating the hanging bar bracket of the system of FIG. 1.
Figure 5:
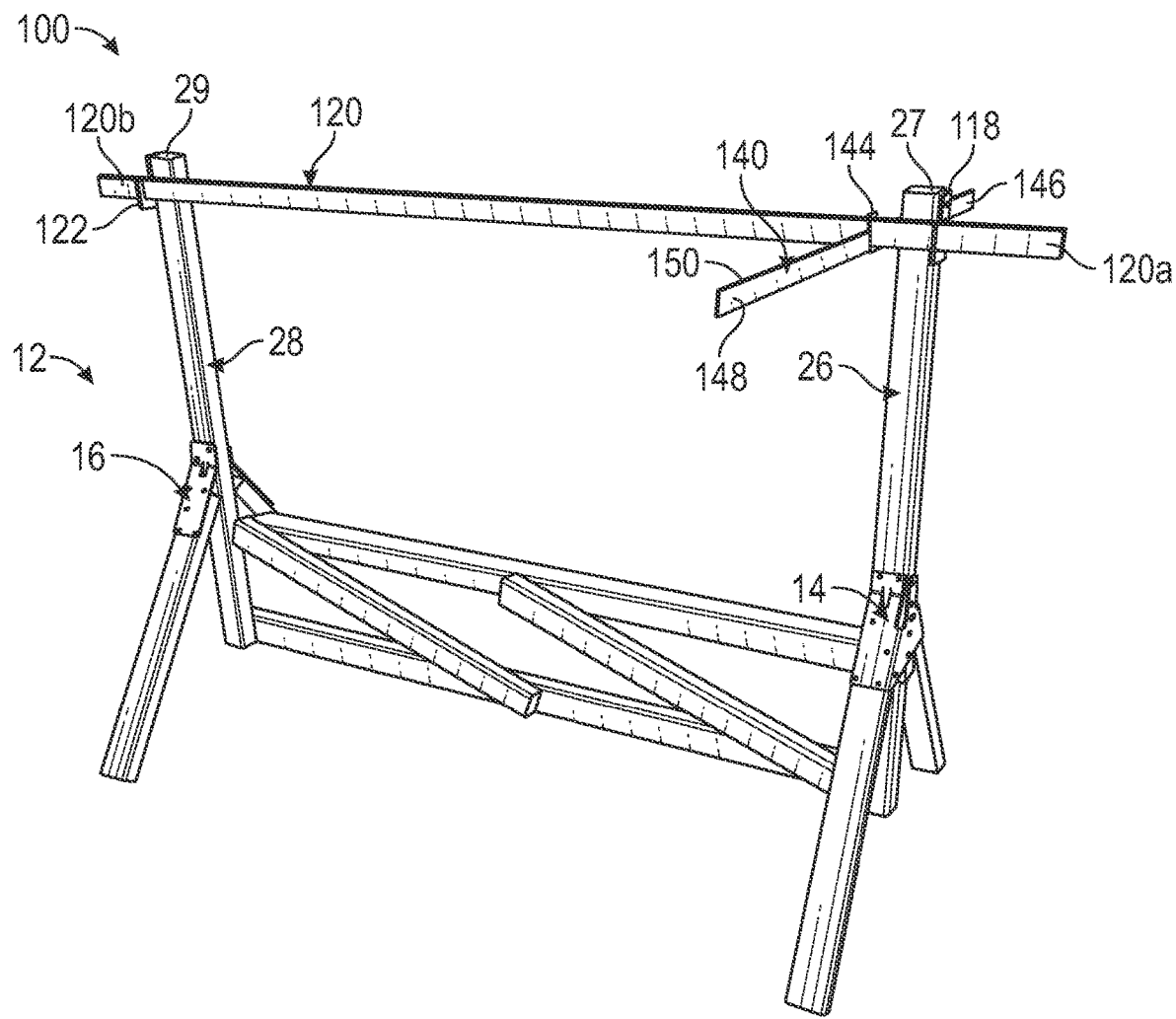
FIG. 5 is another aspect of a vegetation hanging and drying system including the stand, a horizontal support bar supported on the stand, and a vegetation hanger supported on the horizontal support bar.

With reference to FIGS. 1 and 4, the hanging bar brackets 18, 20 may form a part of the vegetation hanging and drying system 10. The hanging bar brackets 18, 20 each include a main plate 70, and a pair of spaced-apart fingers 72, 74 extending upwardly from the main plate 70 and being coplanar therewith. The main plate 70 may have a rectangular shape and define a pair of upper and lower holes 76, 78 configured for receipt of a fastener. The pair of spaced-apart fingers 72, 74 each have a bottom end formed with or otherwise coupled to the main plate 70, and a top end 80, 82. The top end 80, 82 of the fingers 72, 74 may be tapered to facilitate insertion of a horizontal support bar 120 (FIG. 5) therebetween. The fingers 72, 74 define a rectangular-shaped notch 84 configured for receipt of the horizontal support bar 120 (FIG. 5). The rectangular shape of the notch 84 corresponds with a rectangular-shaped cross-section of the horizontal support bar 120 and resists rotation of the horizontal support bar 120 within and relative to the hanging bar brackets 18, 20. The hanging bar brackets 18, 20 may be fabricated from a lightweight metal, plastic, composite material, or any other suitable material.

To assemble the hanging and drying system 10 of FIG. 1, top end portions of the first and second elongate elements 34, 36 of the first leg assembly 22 are positioned into the cavity 52 (FIG. 3) of the first multi-rack bracket 14 and into abutment with the first side plate 44 and an inner surface of the main plate 42, and the second side plate 57 and the inner surface of the main plate 42, respectively. The first vertical shaft 26 is positioned between the top end portions of the first and second elongate elements 34, 36 and in the channel 58 of the multi-rack bracket 14, whereby the first leg assembly 22 is formed, as shown in FIGS. 1 and 2. While holding the first leg assembly 22, the first vertical support shaft 26, and the multi-rack bracket 14 in place, the fasteners 66 are positioned within the holes 64 of the multi-rack bracket 14 to secure the first side plate 44 and the main plate 42 to the first elongate element 34, the first flange 48 to the first vertical support shaft 26, the bottom and top portions 42a, 42b of the main plate 42 to the first vertical support shaft 26, the second side plate 46 and the main plate 42 to the second elongate element 36, and the second flange 50 to the first vertical support shaft 26. The second leg assembly 24 and the second vertical shaft 28 are assembled to one another using the second multi-rack bracket 16 in the same manner.

With the first and second leg assemblies 22, 24 secured to the respective first and second vertical shafts 26, 28, the first and second horizontal shafts 30, 32 are positioned between and fastened to the first and second vertical shafts 26, 28. The main plate 70 (FIG. 4) of the hanging bar brackets 18, 20 are fastened to top end portions 27, 29 of the first and second vertical shafts 26, 28, respectively. The notch 84 (FIG. 4) of the hanging bar brackets 18, 20 are positioned above and in overlapping alignment with the top end portion 27, 29 of the first and second vertical shafts 26, 28. Opposing ends portions 120a, 120b (FIG. 5) of the horizontal hanging bar 120 are received within the notches 84 of the respective hanging bar brackets 18, 20 to position the horizontal hanging bar 120 directly above the first and second vertical shafts 26, 28. The horizontal hanging bar 120 may further include vegetation hangers 140 (FIG. 5) configured to receive cut vegetation.

With reference to FIG. 5, another type of a vegetation hanging and drying system 100 is shown. The vegetation hanging and drying system 100 is similar to and may include any of the features of the vegetation hanging and drying system 10 of FIG. 1 except as explicitly contradicted below. The vegetation hanging and drying system 100 includes the stand 12, the pair of multi-rack brackets 14, 16, the horizontal support bar 120, and a pro hanger 140. Instead of using the hanging bar brackets 18, 20 of FIG. 4, the vegetation hanging and drying system 100 of FIG. 5 includes J-brackets 118 that attach to the top end portions 27, 29 of the first and second vertical shafts 28, 30.

Each of the J-brackets 118 has a hooked portion 122 configured to protrude laterally outward from the vertical shafts 26, 28 and defines a notch configured for receipt of the respective end portions 120a, 120b of the horizontal support bar 120. In this way, the horizontal hanging bar 120 is offset from (e.g., to the side of) the first and second vertical support shafts 26, 28.

The pro hanger 140 defines a rectangular-shaped hole in a middle portion 144 thereof that receives the horizontal support bar 120 to allow for sliding of the pro hanger 140 therealong. The pro hanger 140 further includes first and second elongated plates 146, 148 or blade portions extending outwardly in opposing directions from the middle portion 144. The first and second elongated plates 146, 148 have an upper surface 150 defining a plurality of undulations that support and resist sliding of vegetation therealong.

Figure 6:
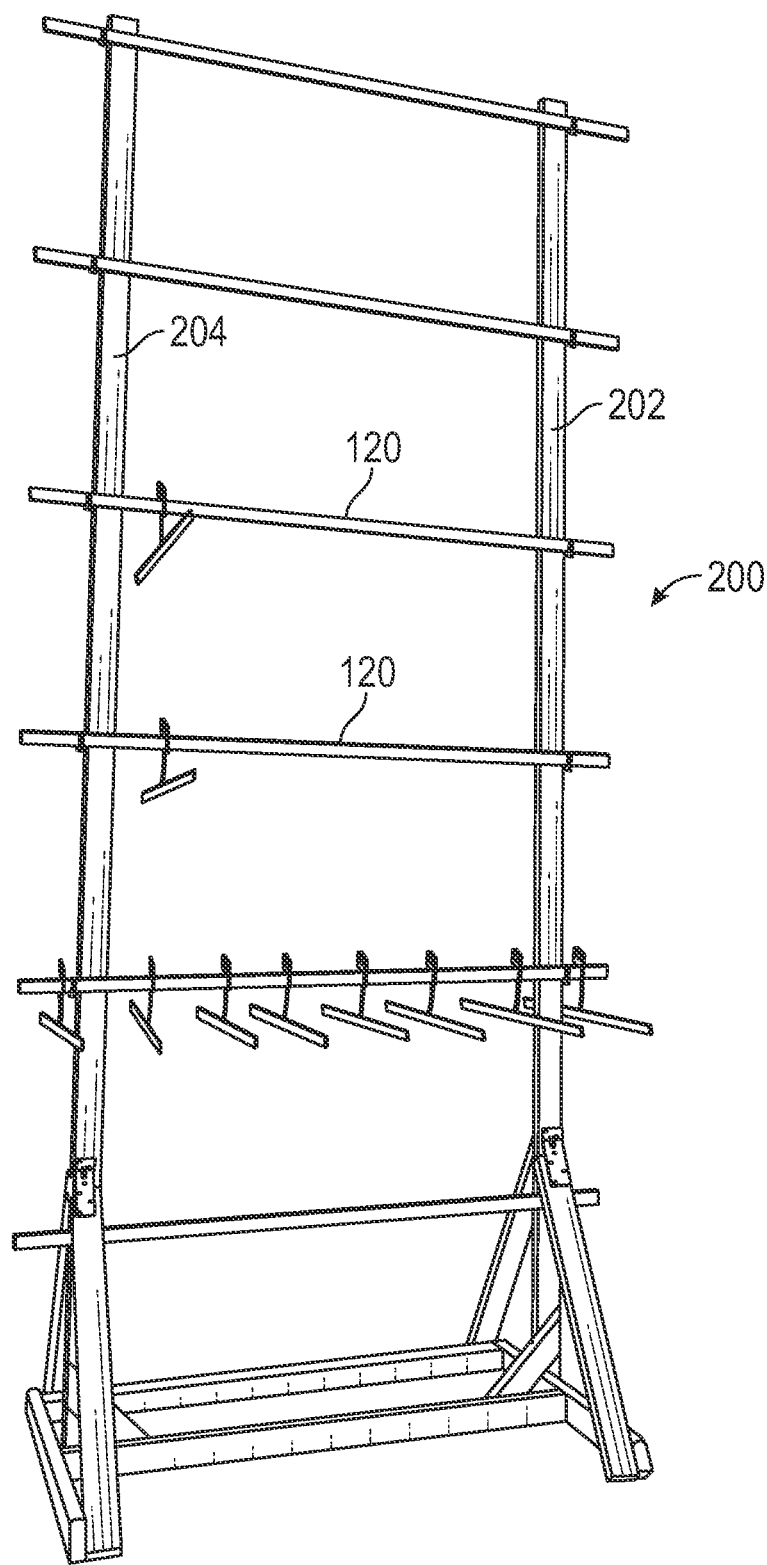
FIG. 6 is another aspect of a vegetation hanging and drying system including a column stand, a number of horizontal support bars supported on the stand, and a plurality of vegetation hangers supported on the horizontal support bars.

FIG. 6 shows a similar hanging and drying system 200 as that shown in FIG. 5, but has first and second vertical shafts 202, 204 that extend at a height allowing for the stacking of a plurality of horizontal hanging bars 120.

Persons skilled in the art will understand that the devices specifically described herein and illustrated in the accompanying drawings are non-limiting exemplary embodiments. It is envisioned that the elements and features illustrated or described in connection with one exemplary embodiment may be combined with the elements and features of another without departing from the scope of the disclosure. As well, one skilled in the art will appreciate further features and advantages of the disclosure based on the above-described embodiments. Accordingly, the disclosure is not to be limited by what has been particularly shown and described.

What is claimed:

1. A multi-rack bracket for use in a vegetation hanging and drying system, the multi-rack bracket comprising:
   a main plate having a generally triangular shape and including a first lateral edge and an opposite second lateral edge;
   a first side plate extending perpendicularly from the first lateral edge of the main plate;
   a second side plate extending perpendicularly from the second lateral edge of the main plate;
   a first flange extending upwardly from the first side plate; and
   a second flange extending upwardly from the second side plate, the first and second flanges defining a gap therebetween configured for capturing a vertical support shaft of the vegetation hanging and drying system, wherein the main plate, the first side plate, and the second side plate collectively define a cavity configured for receipt of a leg assembly and the vertical support shaft of the vegetation hanging and drying system,
   wherein each of the first and second flanges has a tab extending downwardly therefrom and into the cavity to resist tilting of the vertical support shaft relative to the first and second flanges.

2. The multi-rack bracket according to claim 1, wherein the main plate includes a bottom portion having the first and second lateral edges, and a top portion extending upwardly from the bottom portion, the top portion extending alongside of the first and second flanges.

3. The multi-rack bracket according to claim 2, wherein the top portion of the main plate and the first and second flanges collectively define a rectangular-shaped channel configured to capture the vertical support shaft therein.

4. The multi-rack bracket according to claim 1, wherein the tabs are coplanar with the respective first and second flanges.

5. The multi-rack bracket according to claim 1, wherein each of the main plate, the first and second side plates, and the first and second flanges has at least one hole configured for receipt of a fastener.

6. The multi-rack bracket according to claim 1, wherein the first side plate is parallel with the first lateral edge of the main plate, and the second side plate is parallel with the second lateral edge of the main plate.

7. The multi-rack bracket according to claim 6, wherein the first and second flanges are parallel with one another.

8. The multi-rack bracket according to claim 1, wherein the main plate, the first and second side plates, and the first and second flanges are monolithically formed with one another from a single piece of sheet metal.

9. The multi-rack bracket according to claim 1, wherein the first and second flanges extend at an obtuse angle from the respective first and second side plates.

10. A vegetation hanging and drying system, comprising:
    a harvest stand including:
       first and second leg assemblies;
       a horizontal shaft configured to extend between and interconnect the first and second leg assemblies; and
       first and second vertical support shafts configured to extend upwardly from the respective first and second leg assemblies;
    a first multi-rack bracket configured to secure the first leg assembly to the first vertical support shaft;
    a second multi-rack bracket configured to secure the second leg assembly to the second vertical support shaft, wherein at least the first multi-rack bracket includes:
       a main plate including a first lateral edge and an opposite second lateral edge;
       a first side plate extending perpendicularly from the first lateral edge of the main plate;
       a second side plate extending perpendicularly from the second lateral edge of the main plate;
       a first flange extending upwardly from the first side plate; and
       a second flange extending upwardly from the second side plate, the first and second flanges defining a gap therebetween configured for capturing the first vertical support shaft, wherein the main plate, the first side plate, and the second side plate collectively define a generally triangular-shaped cavity configured for receipt of the first leg assembly and the first vertical support shaft; and
    a pair of hanging bar brackets configured to attach to top ends of the respective first and second vertical support shafts, each of the pair of hanging bar brackets including:
       a main plate defining at least one hole configured for receipt of a fastener, the main plate of the pair of hanging bar brackets being configured to abut the top end of the respective first and second vertical support shafts; and
       a pair of spaced-apart fingers extending upwardly from the main plate of the hanging bar brackets.

11. The vegetation hanging and drying system according to claim 10, wherein the main plate of the first and second multi-rack bracket has a generally triangular shape.

12. The vegetation hanging and drying system according to claim 10, wherein each of the main plate of the first and second multi-rack bracket, the first and second side plates, and the first and second flanges has at least one hole configured for receipt of a fastener.

13. The vegetation hanging and drying system according to claim 10, wherein the first side plate is parallel with the first lateral edge of the main plate, and the second side plate is parallel with the second lateral edge of the main plate.

14. The vegetation hanging and drying system according to claim 13, wherein the first and second flanges are parallel with one another.

15. The vegetation hanging and drying system according to claim 10, wherein the main plate, the first and second side plates, and the first and second flanges are monolithically formed with one another from a single piece of sheet metal.

16. The vegetation hanging and drying system according to claim 10, further comprising a horizontal support bar for supporting a plurality of hangers thereon, wherein the pair of fingers of each of the hanging bar brackets defines a rectangular-shaped notch configured for receipt of an end portion of the horizontal support bar.

17. The vegetation hanging and drying system according to claim 10, wherein the first leg assembly includes a pair of elongate elements configured to abut against the respective first and second side plates and the main plate of the first multi-rack bracket, the first vertical support shaft configured to be positioned and captured between the pair of elongate elements.

\* \* \* \* \*